United States Patent
Qian et al.

(10) Patent No.: US 9,602,850 B2
(45) Date of Patent: Mar. 21, 2017

(54) METADATA VALIDATION

(71) Applicant: Verizon Patent and Licensing Inc., Basking Ridge, NJ (US)

(72) Inventors: Yuhui Qian, Lexington, MA (US); Jianxiu Hao, Lexington, MA (US); Zhiying Jin, Lexington, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 13/959,868

(22) Filed: Aug. 6, 2013

(65) Prior Publication Data

US 2015/0046938 A1    Feb. 12, 2015

(51) Int. Cl.
| | |
|---|---|
| *H04N 7/16* | (2011.01) |
| *G06F 3/00* | (2006.01) |
| *G06F 13/00* | (2006.01) |
| *H04N 5/445* | (2011.01) |
| *H04N 21/235* | (2011.01) |
| *H04N 21/8355* | (2011.01) |

(52) U.S. Cl.
CPC ... *H04N 21/2353* (2013.01); *H04N 21/83555* (2013.01)

(58) Field of Classification Search
USPC .................................................. 725/74–104
See application file for complete search history.

(56) References Cited

U.S. PATENT DOCUMENTS

| | | | | |
|---|---|---|---|---|
| 7,177,520 | B2* | 2/2007 | Zetts ..................... | G11B 27/002 370/510 |
| 7,222,163 | B1* | 5/2007 | Girouard et al. ............. | 709/219 |
| 7,680,759 | B1* | 3/2010 | Coley et al. ........... | 707/999.001 |
| 8,245,265 | B2* | 8/2012 | Yoon .................... | H04N 21/235 725/132 |
| 8,478,664 | B1* | 7/2013 | Xavier et al. ................ | 705/26.7 |
| 8,566,869 | B2* | 10/2013 | Goziker ............... | H04N 5/4401 348/558 |
| 2003/0028896 | A1* | 2/2003 | Swart et al. ................... | 725/127 |
| 2004/0136698 | A1* | 7/2004 | Mock ............................ | 386/123 |
| 2004/0154039 | A1* | 8/2004 | Simms .................. | H04N 7/173 725/39 |
| 2005/0182792 | A1* | 8/2005 | Israel et al. ................ | 707/104.1 |
| 2007/0294726 | A1* | 12/2007 | Drazin ............................ | 725/39 |
| 2008/0092168 | A1* | 4/2008 | Logan et al. .................... | 725/44 |
| 2008/0168508 | A1* | 7/2008 | Hamada et al. ................. | 725/91 |
| 2010/0100896 | A1* | 4/2010 | Rouhana, Jr. ..................... | 725/1 |
| 2010/0186041 | A1* | 7/2010 | Chu et al. ......................... | 725/46 |
| 2011/0004897 | A1* | 1/2011 | Alexander ......... | H04N 7/17336 725/32 |

(Continued)

*Primary Examiner* — Mushfikh Alam

(57) ABSTRACT

A method includes receiving a video content metadata entry. The method also includes accessing video content metadata validation rules. The method further includes determining whether the video content metadata entry is valid based on the video content metadata validation rules. The video content metadata entry is reported as a valid video content metadata entry in response to a determination that the video content metadata entry is valid. The method also includes reporting the video content metadata entry as an invalid video content metadata entry in response to a determination that the video content metadata entry is invalid.

20 Claims, 8 Drawing Sheets

(56) References Cited

U.S. PATENT DOCUMENTS

| | | | |
|---|---|---|---|
| 2012/0278844 A1* | 11/2012 | Curtis et al. ................ 725/93 |
| 2012/0278846 A1* | 11/2012 | Nijim ................ H04N 21/4334 |
| | | | 725/115 |
| 2013/0007794 A1* | 1/2013 | Besehanic ............ H04L 65/607 |
| | | | 725/20 |
| 2014/0109133 A1* | 4/2014 | Kitazato ............ H04N 21/4126 |
| | | | 725/32 |
| 2014/0130099 A1* | 5/2014 | Kunisetty ................ 725/50 |
| 2014/0181864 A1* | 6/2014 | Marshall ........ H04N 21/234309 |
| | | | 725/38 |
| 2014/0366052 A1* | 12/2014 | Ives ................ H04N 21/23418 |
| | | | 725/19 |
| 2015/0082351 A1* | 3/2015 | Kashyap ................ H04N 21/21 |
| | | | 725/44 |

* cited by examiner

| 600 | VIDEO CONTENT METADATA FIELD 610 | FIELD VALUE 612 |
|---|---|---|
| PURCHASE OPTION FLAG 620 | HD RENTAL | Y/N |
| | HD PURCHASE | Y/N |
| | SD RENTAL | Y/N |
| | SD PURCHASE | Y/N |
| BILLING ID 622 | HD RENTAL BILLING ID | A1234 |
| | HD PURCHASE BILLING ID | B1234 |
| | SD RENTAL BILLING ID | C1234 |
| | SD PURCHASE BILLING ID | D1234 |
| PRICE INFO 624 | HD RENTAL PRICE | 3.99 |
| | HD PURCHASE PRICE | 14.99 |
| | SD RENTAL PRICE | 1.99 |
| | SD PURCHASE PRICE | 9.99 |
| RELATED WINDOWS 626 | HD LICENSING WINDOW START | 2013-08-11 |
| | HD LICENSING WINDOW END | 2031-12-31 |
| | HD RENTAL WINDOW START | 2014-01-01 |
| | HD RENTAL WINDOW END | 2014-12-31 |
| | HD PURCHASE WINDOW START | 2013-08-11 |
| | HD PURCHASE WINDOW END | 2016-12-31 |
| | ... | ... |

FIG. 6

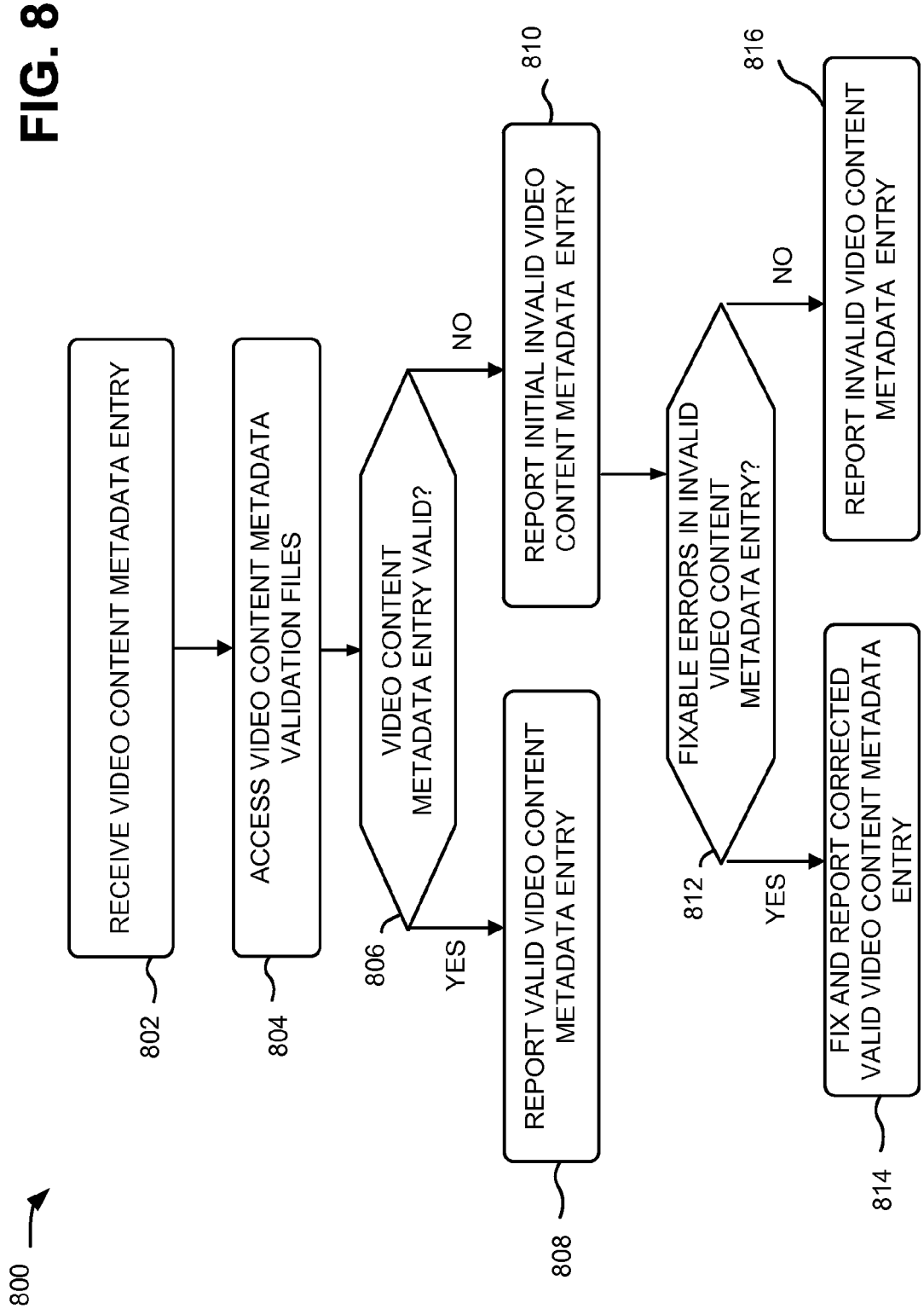

METADATA VALIDATION

BACKGROUND

Video service providers currently provide multiple services and programs, including cable television, network television, and video on demand, to their customers. Video content may be hosted by a video content provider and provided to devices associated with customers of the video content provider. In some instances, individual customers may receive combinations of these multiple services from a single video service provider.

Video service providers may receive video content from one of more video content providers. The video content may include video content metadata that describes aspects of the video content, such as a type of video program, a year of release, a title of the video program, a content provider for the video content, etc. The service provider may use the video content metadata in processing the video content and transactions with the video content provider and end user customers. Customers may complete a transaction such as a subscription, purchase, or rental and receive an entitlement to access to particular video content from the video content provider based on particular metadata.

BRIEF DESCRIPTION OF THE DRAWINGS

FIG. 6 illustrates an exemplary purchase video content metadata configuration table;

FIG. 8 is a flow chart of an exemplary process for validating video content metadata for video content according to an implementation described herein.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may validate video content metadata for digital video content and physical video content. Digital video content may be video content that is received from digital video content suppliers and distributed digitally (e.g., via a cable, Internet or mobile telecommunications network). Physical video content may be video content that is received from physical video content suppliers and distributed in a physical (e.g., a Blu-ray disc, DVD disc or other non-transitory medium). The video content metadata may be data that describes the aspects of the video content, including with respect to the digital video content and the physical video content. The video content metadata may be validated based on video content metadata configuration files associated with a combined catalog for the digital and physical video content and ingested into the combined catalog. The video content metadata may be received (and transmitted) along with the video content.

Consistent with embodiments, the video content metadata may be validated to identify errors in mandatory fields and supplemental fields. Mandatory fields may include information that is required in all instances of video content metadata for the particular type of video content. Supplemental fields may be optionally included with the video content metadata. Systems and methods may validate the video content metadata based on a predetermined standard configuration for the video content metadata. A video content metadata error report may be generated for each set of video content metadata that is validated.

Figure 1:
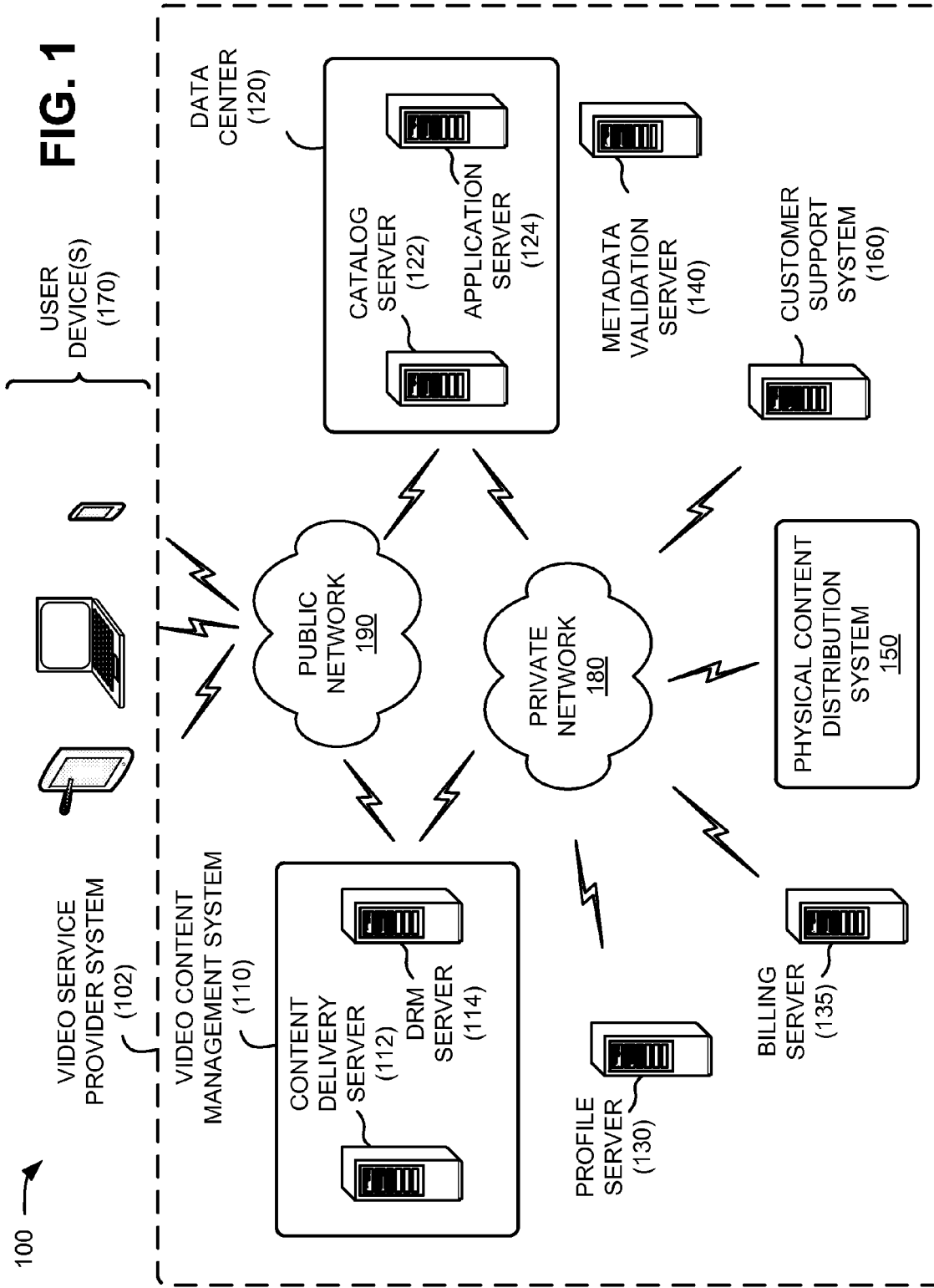
FIG. 1 is an exemplary network in which systems and/or methods described herein may be implemented.

FIG. 1 is an exemplary network 100 in which systems and/or methods described herein may be implemented. As illustrated, network 100 may include a video service provider system 102 and user devices 170, which may receive an online video service from video service provider system 102. Video service provider system 102 may include video content management system (VCMS) 110, a data center 120, a profile server 130, a billing server 135, a video content metadata validation server 140, a physical video content distribution system 150, a customer support system 160, user devices 170, a private network 180, and a public network 190. The particular arrangement and number of components of network 100 shown in FIG. 1 are illustrated for simplicity. In practice there may be more VCMSs 110, data centers 120, profile servers 130, billing servers 135, video content metadata validation servers 140, physical video content distribution systems 150, customer support systems 160, user devices 170, and/or networks 180/190. Components of network 100 may be connected via wired and/or wireless links.

User devices 170 may enable a user to receive digital video content (i.e., an online video session, a cable subscription) from video service provider system 102. In other implementations user devices 170 may play physical video content (e.g., DVD discs, Blu-ray discs) that is purchased or rented from a physical video content provider associated with physical video content distribution system 150 (e.g., a video store). User devices 170 may use video content metadata in association with (e.g., for requesting, searching, playing, etc.) video content. User devices 170 may include, for example, set top box, a gaming console, a personal communications system (PCS) terminal (e.g., a smartphone that may combine a cellular radiotelephone with data processing and data communications capabilities), a tablet computer, a personal computer, a laptop computer, an Internet television, or other types of computation or communication devices.

Video service provider system 102 may be part of a core network that provides digital video content. Video service provider system 102 may be affiliated with a service provider entity (e.g., a commercial video service provider). Video service provider system 102 may provide multiscreen support for an online video service via which the video content is distributed digitally (e.g., for Internet protocol (IP) based video content) to user devices 170.

VCMS 110 may aggregate content, process content, and distribute content. In one implementation, VCMS 110 may include a content delivery server 112 and a digital rights management (DRM) server 114. VCMS 110 may aggregate content and transcode content into a digital format suitable for consumption on particular user devices 170. VCMS 110 may also encrypt data and communicate with user devices 170 through DRM server 114 to enforce digital rights.

Content delivery server 112 may deliver digital content from a backend server to user devices 170. In one implementation, content delivery server 112 may include a streaming server that provides streaming data packets (e.g., via a streaming uniform resource locator (URL)) to user devices 170 (e.g., via public network 190). In one implementation, a streaming URL may be session-based, such that each URL can be used only once for one user device 170 for security purposes.

DRM server 114 may issue, validate, and/or enforce DRM licenses to a mobile client, such as an application running on one of user devices 170.

Data center 120 may manage the authorization, selection, and/or purchase of multimedia content by a user of user device 170 (i.e., based on input associated with the user received from user device 170). As shown in FIG. 1, data center 120 may include a catalog server 122 and an application server 124. In one implementation, user devices 170 may access data center 120 via public network 190.

Catalog server 122 may provide a combined catalog of physical and digital video content for users (e.g., of user devices 170) to order/consume video content (e.g., buy, rent, or subscribe). The combined catalog may allow end users to access, search or request video content in different formats based on the video content metadata, including video content provided in both physical video content and digital video content formats. For example, a user may purchase access to physical video content and receive access to the corresponding digital video content based on the video content metadata. The user may also place a reservation for physical video content at a kiosk location based on the video content metadata.

In one implementation, catalog server 122 may collect and/or present listings of content available to user devices 170. For example, catalog server 122 may receive video content metadata, including digital content metadata and physical video content metadata, which describes aspects of the video content, such as a type of video program, a year of release, a title of the video program, a content provider for the video content, etc., from video content metadata validation server 140 after the video content metadata has been validated. Catalog server 122 may use the video content metadata to provide currently available content options to user devices 170. Catalog server 122 may provide the video content metadata to user device 170 directly or may communicate with user device 170 via application server 124.

Application server 124 may provide a backend support system for applications residing on user devices 170. For example, application server 124 may permit user device 170 to download an application that enables a user to find content of interest or play downloaded or streaming content. Application server 124 may provide digital content in association with VCMS 110.

Video content metadata validation server 140 may validate video content metadata for digital video content and physical video content that is to be ingested into a combined video content catalog (stored, e.g., in catalog server 122) for video content as described below with respect to FIGS. 3 through 8. Video content metadata validation server 140 may receive the video content metadata from content delivery server 112 and/or physical video content distribution system 150. Video content metadata validation server 140 may determine whether received video content metadata conforms to a predetermined video content metadata format and rules applying to entries to the combined video content catalog.

Profile server 130 may store user profile information for users (e.g., users of user devices 170). The user profile information may include various information regarding a user, such as login information (e.g., a user identifier and a password), billing information, address information, types of services to which the user has subscribed, a list of content purchased by the user, a list of video content rented by the user, a list of video content to which the user has subscribed, a user device identifier (e.g., a media player identifier, a mobile device identifier, a set top box identifier, a personal computer identifier) for user device 170, a video application identifier associated with the video application obtained from application server 124, or the like.

Billing server 135 may manage charging users for services provided via video service provider system 102. Billing server 135 may include, for example, a payment processing component, a billing component, and/or a settlement component. In some implementations, billing services may be performed by servers external to video service provider system 102 (e.g., billing servers for a partner entity). Billing server 135 may use video content metadata in executing settlement of payments received from customers. For example, digital video content may be provided by a first partner entity (e.g., a digital video service provider that distributes digital video content) in association with a second partner entity (e.g., a physical video content distributor that distributes physical video content, such as a video store). The payment may be divided among the partner entities based on a contractual agreement between the partner entities. Payments may also require routing to content providers for the video content. The video content providers may include a digital video content provider that provides digital video content or a physical video content provider of the physical video content, which may be the same entity, such as a video content producer (e.g., a film studio).

Physical video content distribution system 150 may track availability of physical video content (e.g., DVDs, Blu-ray discs, memory cards, etc.) and provide video content metadata relating to the physical video content for inclusion in catalog information provided to users of user devices 170. In one implementation, physical video content distribution system 150 may also provide physical video content information, such as location information, so that when a user wants to buy physical video content, the system may direct the user to the nearest location for purchasing the physical video content. Additionally, or alternatively, physical video content distribution system 150 may generate or receive credit information for users (e.g., for cross-promotion purposes with a partner entity). For example, after a user of user device 170 has purchased digital content or a subscription/rental of digital content, the user may be entitled to credits for obtaining a corresponding physical asset or vice versa.

Customer support system 160 may solicit and/or receive user feedback, questions, or credit/billing-related requests. Customer support system 160 may provide customer support based on video content metadata associated with video content items for which an end user has rights (e.g., via rental, purchase, etc.).

Private network 180 may include, for example, one or more private IP networks that use a private IP address space. Private network 180 may include a local area network (LAN), an intranet, a private wide area network (WAN), etc. In one implementation, private network 180 may implement one or more Virtual Private Networks (VPNs) for providing communication between, for example, any of VCMS 110, data center 120, profile server 130, billing server 135, physical video content distribution system 150, and/or customer support system 160. Private network 180 may be protected/separated from other networks, such as public network 190, by a firewall. Although shown as a single element in FIG. 1, private network 180 may include a number of separate networks.

Public network 190 may include a LAN, a WAN, such as a cellular network, a satellite network, a fiber optic network, a private WAN, or a combination of the Internet and a private WAN, etc., that is used to transport data. Although shown as a single element in FIG. 1, public network 190 may include a number of separate networks that function to provide services to user devices 170.

In implementations described herein, video content metadata may be validated for consistency with a predetermined video content metadata catalog format based on video content metadata configuration files for a video content catalog that includes combined listings of physical video content items and digital video content items. Video content metadata may be validated for consistency across physical video content items and digital video content items. Video content metadata may also be validated for required formats, attributes, etc. The configuration files may also include rules by which the video content metadata that does not fit (or conform) to a predetermined video content metadata format are brought into compliance.

Figure 2:
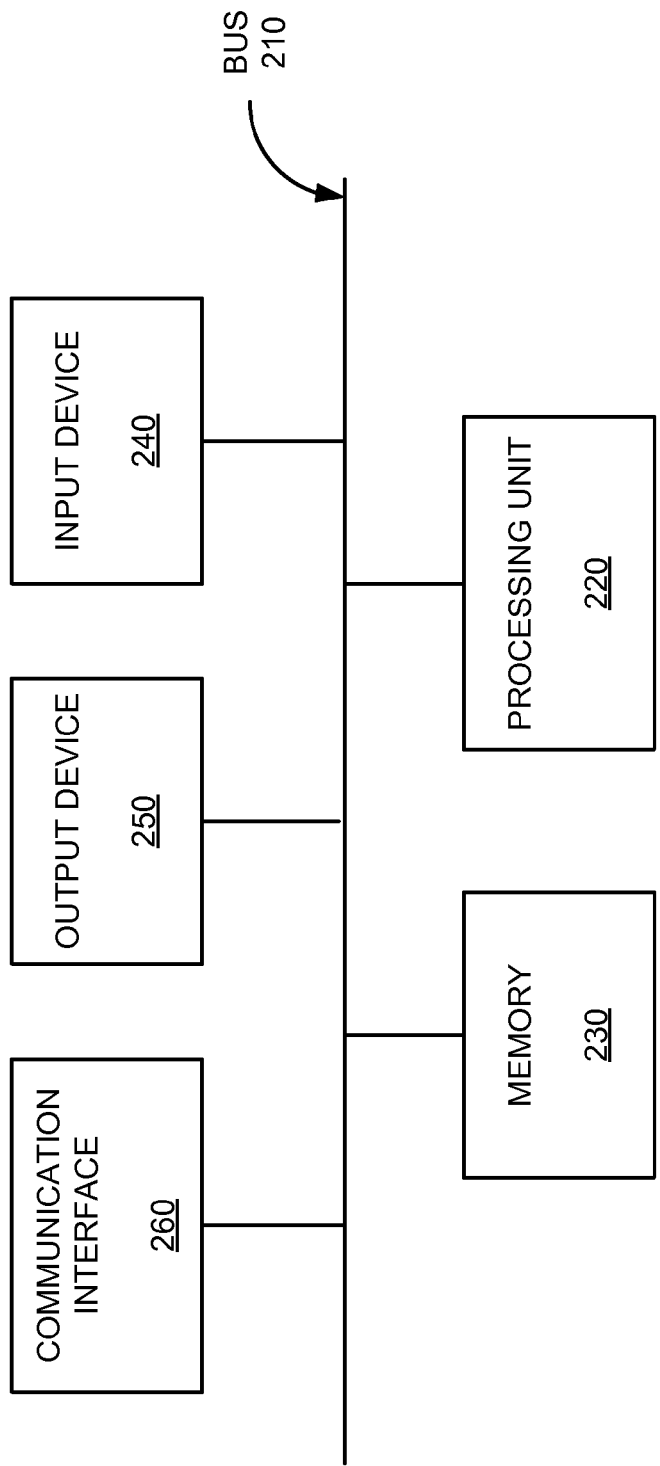
FIG. 2 is a block diagram of exemplary components of a device that may correspond to one of the devices of FIG. 1.

FIG. 2 is a diagram of exemplary components of a device 200. Each of VCMS 110, content delivery server 112, DRM server 114, data center 120, catalog server 122, application server 124, profile server 130, billing server 135, video content metadata validation server 140, physical video content distribution system 150, customer support system 160, or user device 170 may include one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of network 100.

As described herein, device 200 may perform certain operations in response to processing unit 220 executing machine-readable instructions contained in a computer-readable medium, such as memory 230. A computer-readable medium may include a non-transitory memory device. A memory device may include space within a single physical memory device or spread across multiple physical memory devices. The machine-readable instructions may be read into memory 230 from another computer-readable medium or from another device via communication interface 260. The machine-readable instructions contained in memory 230 may cause processing unit 220 to perform processes described herein. Alternatively, hardwired circuitry may be used in place of or in combination with machine-readable instructions to implement processes described herein. Thus, implementations described herein are not limited to any specific combination of hardware circuitry and machine-readable instructions.

Although FIG. 2 shows exemplary components of device 200, in other implementations, device 200 may include fewer components, different components, differently arranged components, or additional components than depicted in FIG. 2. As an example, in some implementations, input device 240 and/or output device 250 may not be implemented by device 200. In these situations, device 200 may be a "headless" device that does not explicitly include an input or an output device. Alternatively, or additionally, one or more components of device 200 may perform one or more other tasks described as being performed by one or more other components of device 200.

Figure 3:
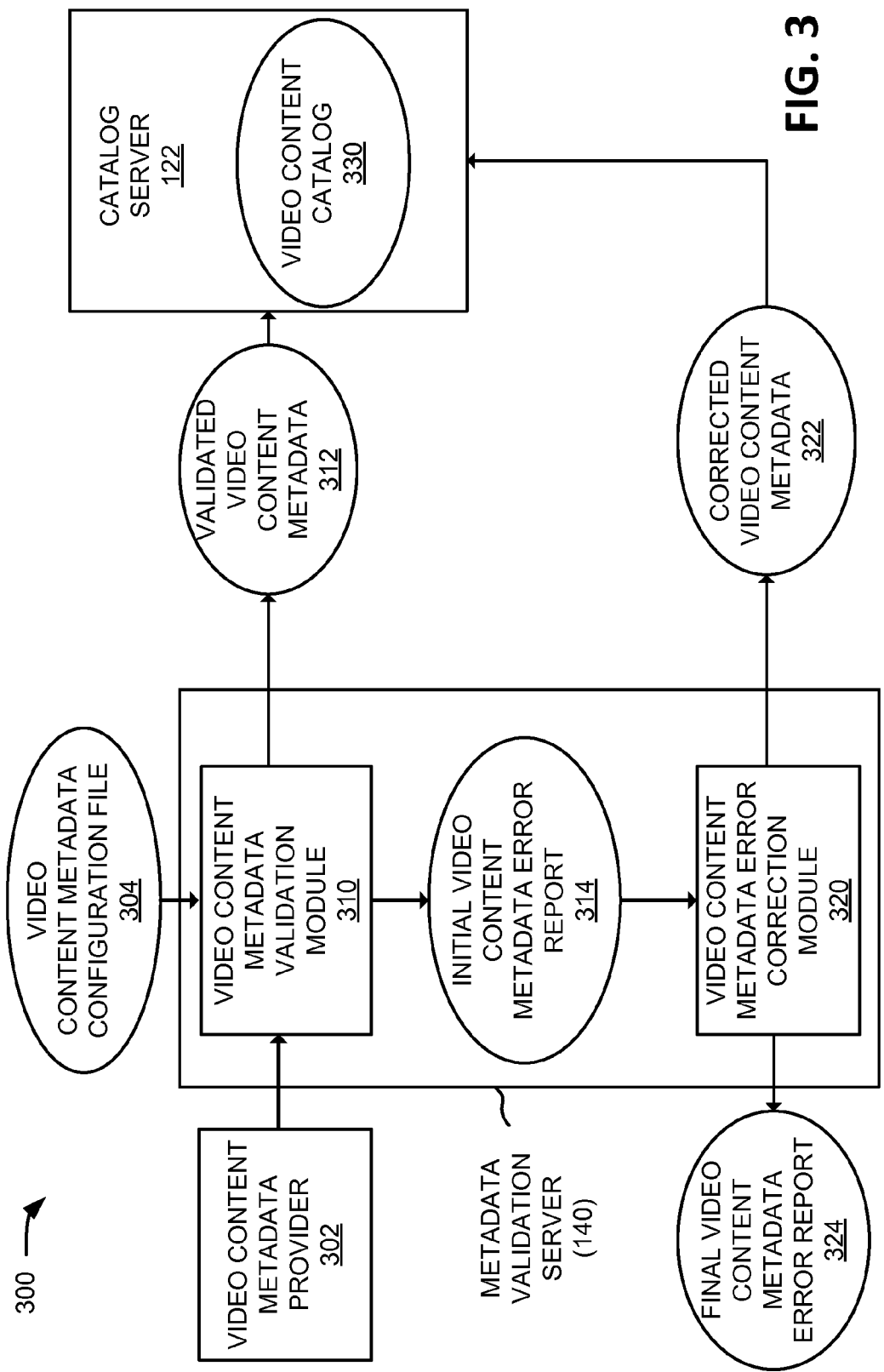
FIG. 3 is a block diagram of a portion of the network of FIG. 1 including metadata processing components.

FIG. 3 is a functional block diagram of a video content metadata validation portion 300 of network 100. Video content metadata validation portion 300 may include components of different networks that may interface with each other to validate video content metadata entries that may be ingested into a video content catalog. As shown in FIG. 3, portion 300 may include a video content metadata source 302, catalog server 122 and video content metadata validation server 140. The particular arrangement and number of components of portion 300 shown in FIG. 3 are illustrated for simplicity. In practice there may be more video content metadata sources 302, catalog servers 122 and/or video content metadata validation servers 140.

Video content metadata source 302 may include a digital video content metadata source or a physical video content metadata source. The physical video content metadata source may provide video content metadata associated with physical video content, such as physical video content items provided by physical video content distribution system 150. The digital video content metadata source may provide video content metadata associated with digital video content, such as digital video content items provided by VCMS 110.

The video content metadata from video content metadata source 302 may include one or more video content metadata entries that may be ingested into a video content catalog 330 stored in catalog server 122 (i.e., the video content metadata may be merged into video content catalog 330). Video content catalog 330 may be a combined catalog of physical video content items and digital video content items. Each particular video content metadata entry in the video content metadata to be ingested into video content catalog 330 may be associated with a particular video content item. For example, a particular film may have particular video content metadata entry that includes video content metadata fields describing the video content, such as a title, a summary of the video content, a year of release of the video content, etc. Video content metadata entries that are to be ingested into the combined video content catalog 330 may be required to have a particular format and to include particular video content metadata fields (e.g., a title, a year, a summary, etc.). Additionally, each video content metadata field may be required to have a particular format (e.g., the video content metadata field may be required to have a particular number or combination of characters, or may be selected from a predetermined list of values for the particular field, etc.).

Video content metadata validation server 140 may validate the video content metadata prior to ingestion into video content catalog 330. Video content metadata validation server 140 may identify whether each video content metadata entry conforms to a required format or whether aspects of the particular video content metadata entry render the entry invalid (i.e., the video content metadata entry is non-conforming). For example, a video content metadata entry may be identified as invalid because of errors, omissions, or deviations from required formats in the video content metadata. Video content metadata validation server 140 may substantially reduce a probability of invalid entries, and consequently reduce ingestion failure because of the video content metadata format/constraint error or due to the missing/error asset elements such as purchase options, or image/preview Uniform Resource Locators (URLs) etc.

Video content metadata validation server 140 may substantially reduce a frequency of video content metadata issues that appear through the client quality assurance process. Video content metadata validation server 140 may substantially reduce adverse impact on service provider or content provider branding by video content metadata errors that reach the end user. Video content metadata validation server 140 may reduce the requirement of manual examination of each video content metadata file (e.g., each video content metadata entry may be included in an Extensible Markup Language (XML) file) to uncover different types of video content metadata errors, such as incorrect format, duplicate entries, missing video content metadata fields, etc.

Video content metadata validation server 140 may receive video content metadata from video content metadata source 302 at video content metadata validation module 310. Video content metadata validation module 310 may validate the video content metadata based on validation requirements included in the video content metadata configuration files 304. The validation requirements may be predetermined and provided based on an agreement between the service provider for the digital video content and the provider for the physical video content. The validation requirements may be selected to allow downstream functions such as settlement between the service provider and partners, customer service, etc., based on the video content metadata (and by extension the video content that the metadata identifies). Video content metadata configuration files 304 may also include video content metadata error correction files that allow invalid video content metadata entries to be fixed in some instances (i.e., the invalid metadata may be transformed into a valid video content metadata entry). Video content metadata validation module 310 may screen the video content metadata prior to the catalog ingestion step to identify video content metadata issues, and to reduce the probability of a requirement for more intensive and time-consuming subsequent catalog cleanup tasks. Video content metadata validation module 310 may output the validated video content metadata 312 to catalog server 122 to be ingested into catalog 330.

According to one embodiment, video content metadata validation module 310 may validate the video content metadata with respect to a particular type of video content item. Video content metadata validation module 310 may be context aware. For example, if the video content item is a movie, video content metadata validation module 310 may validate the particular video content item by applying movie related rules. If the video content metadata also includes a HD rental option, then video content metadata validation module 310 may also validate the video content metadata against a set of HD Rental rules related to these types of digital assets. In other words, video content metadata validation module 310 may validate the video content metadata based on a specific context of the video content metadata. The specific context is determined by a type of video content asset associated with the video content metadata entry.

According to another embodiment, video content metadata validation module 310 may validate the video content metadata with respect to a first video content system (e.g., VCMS 110). Video content metadata validation module 310 may also validate the video content metadata with respect to a second video content system (e.g., physical video content distribution system 150). In instances in which the video content metadata is in compliance with the first video content system but not with the second video content system, video content metadata validation module 310 may determine a first response (e.g., mark as valid and issue a warning in association with the video content metadata). In instances in which the video content metadata is out of compliance with the first video content system and in compliance with the second video content system, video content metadata validation module 310 may determine a second response that is different from the first response (e.g., mark as invalid).

Video content metadata validation module 310 may output validated video content metadata 312 including video content metadata entries to catalog server 122 in instances in which the video content metadata entries comply with validation requirements. Validated video content metadata 312 may include validated video content metadata entries that have been validated to include required video content metadata fields and data that conforms to the predetermined video content metadata format in the video content metadata fields. For example, each of the validated video content metadata entries may include required mandatory video content metadata fields and properly formatted information in the required fields. Additionally, the validated video content metadata entries may include optional video content metadata fields that include properly formatted video content metadata.

Video content metadata validation module 310 may output initial metadata error report 314. The initial metadata error report 314 may include invalid video content metadata entries that are identified as invalid because of errors, omissions, or deviations from required formats in the video content metadata. The initial metadata error report 314 may include a listing of errors, omissions, or deviations from required formats in the video content metadata and corresponding invalid video content metadata entries and the particular video content metadata fields at which the errors, omissions, or deviations from required formats occur. The initial metadata error report 314 may list invalid video content metadata entries that are missing particular video content metadata fields.

According to one embodiment, the initial error data report may be generated in a directory specified in the instructions for video content metadata validation module 310. The initial error data report may include two sub-reports, which may be a profile report and an Alt Code report. The profile report may have a report file name that follows the naming convention of Profile Report yyyy-mm-dd.hh-mm-ss.txt., in which each of yyyy, mm, dd, hh, mm, and ss indicate sequentially, respectively, a year, month, date, hour, minute and second. The Profile report may include a message indicating a particular error or errors in the video content metadata entry. The Alt Code report may have a report file names that follows a similar naming convention and includes a message that reports any title level issues.

Video content metadata error correction module 320 may receive initial metadata error report 314. Video content metadata error correction module 320 may convert the invalid information to valid information, such as describe below with respect to FIG. 7. Video content metadata error correction module 320 may identify invalid video content metadata entries that may be corrected based on video content metadata error correction files. The video content metadata error correction files may include information that allows video content metadata correction module 320 to change invalid video content metadata to valid video content metadata. For example, invalid video content metadata correction files may include invalid information in a video content metadata field that does not correspond to an acceptable format for the particular video content metadata field.

Video content metadata error correction module 320 may output corrected video content metadata 322. Corrected video content metadata 322 may include valid video content metadata entries that have been corrected by video content metadata error correction module 320 based on the video content metadata correction files. Corrected video content metadata 322 may be input to catalog 330.

In some instances, video content metadata error correction module 320 may be unable to correct an invalid video content metadata entry or only able to partially correct the invalid video content metadata entry. In these instances, video content metadata error correction module 320 may compile a error report 324 that includes the invalid video content metadata entries that video content metadata error correction module 320 is unable to correct. Video content metadata error correction module 320 may flag these invalid video content metadata entries for review by personnel associated with the service provider or partner entities.

Video content metadata validation server 140 may be implemented as a digital validation tool (e.g., video content metadata validation server 140 may be implemented on a computing device using machine readable instructions, such as instructions written in Java and based on Extensible Stylesheet Language Transformations (XSLT)) to manage and enforce format and rule validation for video content metadata entries. Video content metadata validation server 140 may be extended to accommodate different (or more) validation requirements based on particular agreements between the service provider and partner entities that may use the video content metadata.

Figure 4:
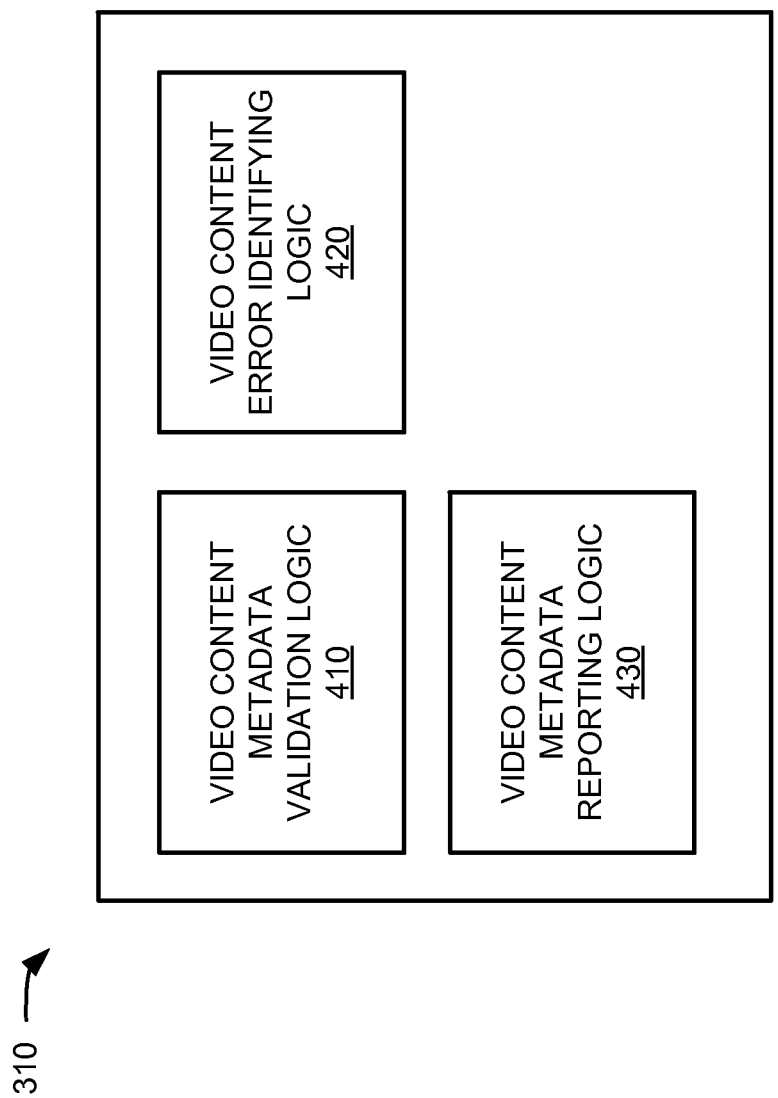
FIG. 4 is a diagram of exemplary functional components of the video content metadata validation server of FIG. 3.

FIG. 4 is an exemplary functional block diagram of video content metadata validation module 310 according to an exemplary implementation. As shown in FIG. 4, video content metadata validation module 310 may include video content metadata validation logic 410, video content metadata error identifying logic 420 and video content metadata reporting logic 430.

Video content metadata validation logic 410 may determine a validity of metadata based on validation requirements provided in video content metadata configuration files associated with a particular type of video content metadata entry (e.g., video content metadata configuration files may be implemented as described with respect to video content metadata configuration file 500, discussed in association with FIG. 5 below). The video content metadata configuration files may be provided based on a particular partner entity or content provider associated with the video content item which the video content metadata entry is based on. Examples of video content metadata configuration files are described below with respect to FIG. 5.

Video content metadata error identifying logic 410 may identify errors in the video content metadata. Video content metadata error identifying logic 410 may compile a video content metadata error report, such as initial video content metadata error report 314, described with respect to FIG. 3 above.

Video content metadata reporting logic 430 may generate reports of video content metadata errors on a video content metadata field basis for each video content metadata entry. Video content metadata reporting logic 430 may identify a percentage of errors in the video content metadata as well as types of errors in the video content metadata.

Figure 5:
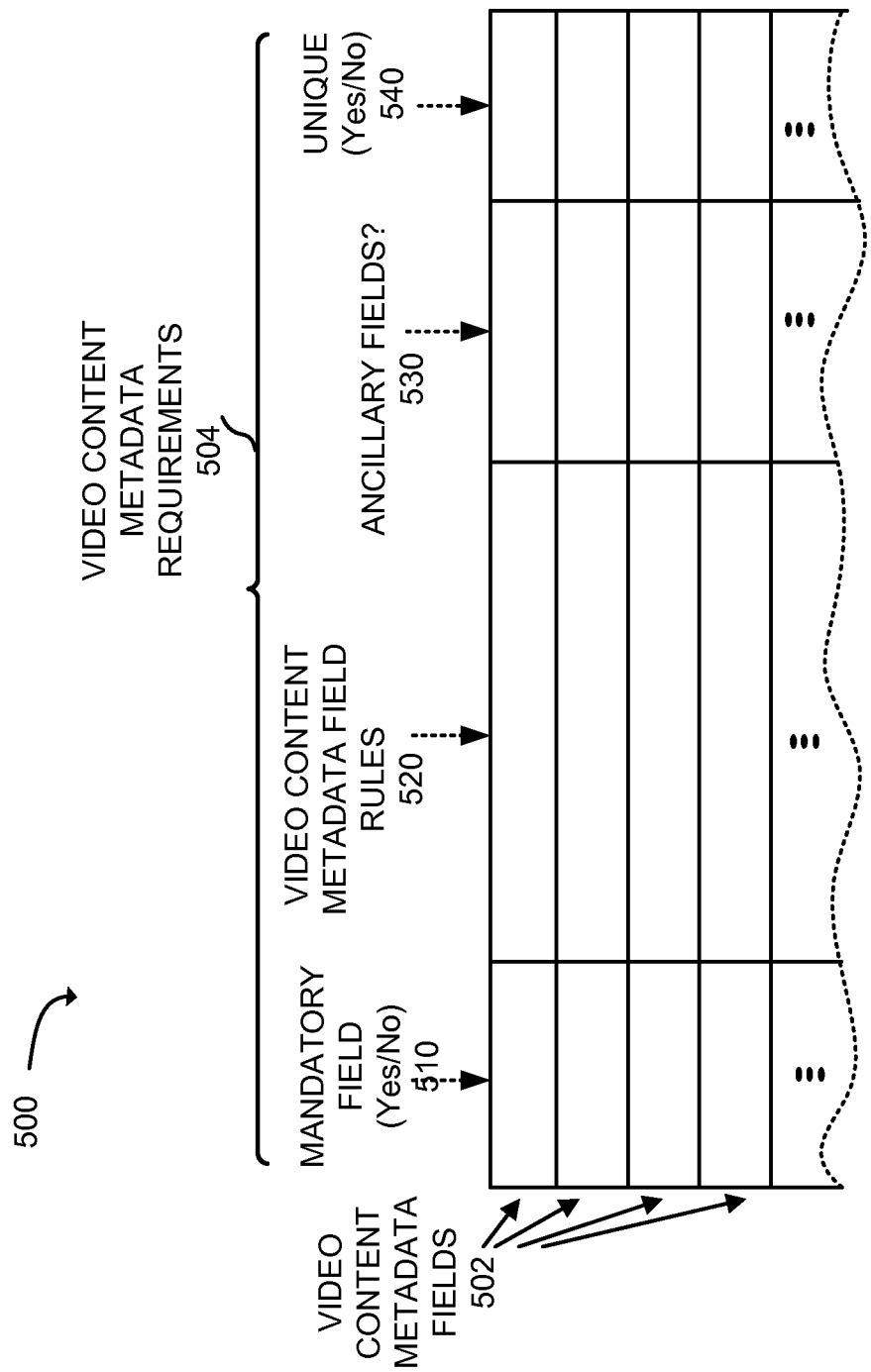
FIG. 5 illustrates an exemplary metadata configuration file.

FIG. 5 illustrates an exemplary video content metadata validation requirement file 500. As shown in FIG. 5, video content metadata configuration file 500 may include video content metadata fields 502, and corresponding video content metadata requirements 504 for each video content metadata field 502. Video content metadata requirements 504 may include requirements that video content metadata validation module 310 may check each video content metadata field for including a mandatory field (yes/no) check 510, video content metadata field rules 520, ancillary fields 530, and a unique value (yes/no) check 540.

Video content metadata validation module 310 may validate the video content metadata entries based on video content metadata requirements 504. In other words, video content metadata validation module 310 may check each video content metadata entry and each field of the video content metadata entry for compliance with video content metadata requirements 504.

Validation requirement file 500 may include an indicator 510 of whether a particular video content metadata field 502 is mandatory (yes/no) 510. In other words, each video content metadata entry may be required to include the particular video content metadata field. In some embodiments, validation requirement file 500 may identify a mandatory video content metadata field based on a dependent system for the video content metadata (e.g., billing server 135, physical video content distribution system 110, etc.). Video content metadata validation module 310 may report an error for the video content metadata entry if a mandatory video content metadata field is missing in the video content metadata entry. Mandatory video content metadata fields may include video content type (e.g., show type, movie series type or game type), alt code, a year of release, a title, a long summary, a short summary, actors, etc. In addition, some video content metadata fields may be limited to a single entry, such as alt code, which may include only a single value. An alt code may be a unique defining identifier associated with a video content item.

According to one implementation, video content metadata validation module 310 may provide a warning or otherwise flag the video content metadata entry in instances in which a generally expected video content metadata field for the video content metadata entry is absent (e.g., the video content metadata entry does not contain an actor field). Service provider personnel may receive a prompt to check whether there should be an actor (and corresponding actor field) for the video content metadata entry.

Validation requirement file 500 may include video content metadata field rules 520. The video content metadata field rules 520 may include different rules for the video content metadata in each particular video content metadata field. The video content metadata field rules 520 may identify video content metadata fields, formats, constraints, and other rules for video content metadata entries. The video content metadata entry may include video content metadata fields 502, such as, for example, a genres and ratings field, a game genre field, a physical video content field, a digital video content field, a preview field, an image profile field, a provider field, and a video profile field. The video content metadata field rules 520 may include rules that are applied to the video content metadata fields 502.

For example, video content metadata field rules 520 may include a genres and ratings rule that may be applied to a genres and ratings field. Valid video content metadata entries to video content catalog 330 may require a genre selected from a list of approved values for genres and ratings. For example, approved movie genres may include "action & adventure", "war", "western", "animation", "comedy", "romance", "documentary", "drama", "foreign language", "family & kids", "music & musicals", "SciFi & fantasy", "horror", "thrillers" and "sports". Acceptable movie ratings may include "G", "NC-17", "NR", "PG", "PG-13", "R", "RP", "T", "TV-14", "TV-G", "TV-MA", "TV-PG", "TV-Y", "TV-Y7", "TV 14", "TVG", "TVMA", "TVPG", "TVY", "TVY7" and "Unrated". G indicates acceptable for general audiences, NR indicates that the program is not rated, NC indicates no children under a listed age, R indicates a restricted program, PG indicates that parental guidance is recommended for children below a listed age, RP indicates that a rating is pending and MA indicates mature audiences.

Video content metadata validation module 310 may check a genre and ratings field of a video content metadata entry for a value from the approved genres and ratings. If the video content metadata entry contains a value from the approved genres and ratings, video content metadata validation module 310 may validate the particular video content metadata field. If the particular field contains a value that is not included in the approved genres and ratings, video content metadata validation module 310 may indicate that the particular field is invalid (and consequently indicate that the video content metadata entry is invalid).

Similarly, video content metadata field rules 520 may include a game genre rule that may be applied to the game genre field. Approved game genres may include "Action-Games", "Fighting", "Music & Party", "Role-playing", "Shooter", "Sports", "Strategy". Approved game ratings may include "EC", "E", "E 10+", "T", "M (17+)", and "RP". E indicates a game approved for everyone, while T indicates a game approved for teens. Video content metadata validation module 310 may check video content metadata entries for video games for compliance with the game genre rule.

As another example, a physical video content rule may be applied to a physical video content field. Physical video content field may be a video content metadata field for physical video content. The physical video content rule may require that only one type of physical video content (e.g., either a DVD and/or Blu-ray movie) is allowed for a given title (or alt code). Video content metadata validation module 310 may log an error that multiple DVD or Blu-ray movie elements are detected in (physical video content field(s) for) a single video content metadata entry (e.g., in an XML file for the video content). Video content metadata validation module 310 may identify the video content metadata entry as invalid if multiple physical video content are associated with a physical video content field. Application of the physical video content rule may substantially reduce or prevent duplicated physical video content assets for a particular title. The physical video content rule may prevent ingestion exceptions when the video content metadata entry is input to catalog 330.

According to an embodiment, there may be additional physical asset specific data required in the video content metadata entry for DVD and Blu-ray assets. In some instances, there may be several additional physical video content fields (i.e., video content metadata fields for physical content) required for downstream usage of the video content metadata entry. For example, a product ID for the video content item associated with a partner of the service provider (e.g., an operator of physical video content distribution system 150) may be mandatory when making a Kiosk reservation of the physical video content. Video content metadata validation module 310 may log an error in instances in which these mandatory physical video content fields are missing from the video content metadata.

In another embodiment, digital video content rule may be applied to the digital video content field. Video content metadata validation module 310 may validate digital video related fields for digital video components based on the digital video content rule may require. Video content metadata validation module 310 may validate multiple fields that are critical to correct DRM encryption and video playback. For example, for HLS SM video components, video content metadata validation module 310 may verify that an encryption key identifier is present, that the video URL is valid and that the video content metadata entry includes a correct playlist or manifest type.

A preview rule may be applied to the preview field. Video content metadata validation module 310 may validate preview related metadata fields based on a preview rule. For example, if the video content asset has an associated preview class with a run time being set to longer than a predetermined time (e.g., 10 seconds), video content metadata validation module 310 may verify that the preview URL has valid format against the corresponding target platform. Video content metadata validation module 310 may determine whether the video content metadata entry includes a preview class with run time set to a predetermined maximum interval and determine whether a preview URL includes a valid format if the video content metadata entry includes the preview class. Video content metadata validation module 310 may identify the video content metadata entry as invalid if the preview URL does not include a valid format An image profile rule may be applied to the image profile field. Video content metadata validation module 310 may validate image availability. For example, multiple different image profiles may be provided via multiple types of digital connections (e.g., via both hypertext transfer protocol (HTTP) and hypertext transfer protocol secure (HTTPS) connections). Video content metadata validation module 310 may check that all image profiles are correctly set and available via each of the multiple types of digital connections.

A profile rule may be applied to the video content profile field. Video content metadata validation module 310 may validate video content metadata entries of titles with different resolutions (e.g., standard definition (SD) only title, or high definition (HD) titles). For SD only titles, video content metadata validation module 310 may validate that there are a predetermined number of profiles being published (e.g., HTTP Live Streaming (HLS) SD, smooth streaming (SS) SD, and iPhone SD). For HD title, video content metadata validation module 310 may validate that there are additional profiles (e.g., HLS HD and SS HD). Video content metadata validation module 310 may validate that the SD or HD purchase options (e.g., rental/buy/subscription) are consistent among video profiles for the same title. Video content metadata validation module 310 may also validate that close caption related information is consistent among different profiles. For example, for a particular title, if the CC is available with HLS profiles, video content metadata validation module 310 may identify whether CC fields are also available for SS profiles.

Although particular video content metadata fields are described with respect to FIG. 5, it should be understood that video content metadata entry fields may be validated based on applicable capabilities of video content metadata validation module 310 and associated devices and objectives for each video content metadata entry field. For example, video content metadata validation module 310 may also validate video content metadata entries for additional video content metadata entry fields, such as a provider field (to identify mismatches in content provider names and avoid mistakes at settlement), a licensing window field (to identify mismatches in expiration date of digital video content and physical video content). In one example, the video content metadata entry may be reported as invalid based on the licensing window associated with a digital video content system (e.g., VCMS 110) expiring prior to a licensing window associated with physical video content distribution system 150.

FIG. 6 is an exemplary digital purchase options table 600. Digital purchase options table 600 may include digital purchase options and associated constraints 600. As shown in FIG. 6, digital purchase options table 600 may include video content metadata fields 610 for each purchase option (e.g., HD rental, HD purchase, SD rental, and SD purchase) that includes a field value 612, which correspond to purchase option flag 620. Digital purchase options table 600 may also include billing IDs 622, price info 624 and related windows 626 for each of the purchase options.

Video content metadata validation module 310 may validate purchase options to identify that required fields are present and that properly formatted purchase options metadata is populated in the video content metadata fields for the purchase options (e.g., a field value may be required to be Yes or No, numerical characters, etc.). Video content metadata validation module 310 may identify whether the video content metadata entry includes at least one purchase options field (i.e., video content metadata validation module 310 may determine at least one purchase options field is mandatory). Video content metadata validation module 310 may identify video content metadata errors that will cause ingestion exception, such as the missing purchase options for digital assets. Video content metadata validation module 310 may identify that any digital video content asset includes at least one of the purchase options associated with either HD or SD digital video content. Video content metadata validation module 310 may identify the video content metadata entry for the video content item as invalid and report an error if none of the purchase options are available in the video content metadata.

Video content metadata validation module 310 may identify whether required related windows are included in the video content metadata for each of HD purchase, SD purchase, HD rental, SD rental, HD subscription and SD subscription. For example, related windows may include licensing windows, such as HD licensing window start and HD licensing window end and HD rental window start and HD rental window end for video content metadata entries with available HD rental (i.e., purchase option flag 620 is Y (yes) for HD rental).

Video content metadata validation module 310 may identify whether the video content metadata entry includes required associated fields for the available purchase options based on the purchase options field. Video content metadata validation module 310 may identify as invalid (and therefore an error) video content metadata that does not include required associated fields. Video content metadata validation module 310 may reduce a probability of ingestion error or incorrect downstream behavior (e.g., prevent malfunction of the orchestration layer, video service provider or end user interfaces, or components of video service provider system 102). Video content metadata validation module 310 may check a field dependency for required associated fields. For example, if HD Rental is set to 'Y', then video content metadata validation module 310 may that related HD Rental Billing ID, HD Rental Price, HD Licensing Window, and HD Rental Window are set properly.

Figure 7:
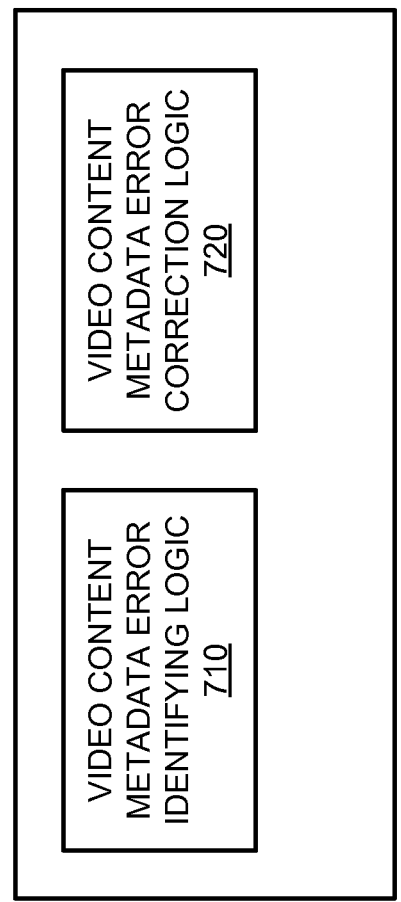
FIG. 7 is a diagram of exemplary functional components of the video content metadata error correction server of FIG. 3.

FIG. 7 is an exemplary functional block diagram of video content metadata error correction module 320 according to an exemplary implementation. As shown in FIG. 7, video content metadata error correction module 320 may include a video content metadata error identifying logic 710 and a video content metadata error correction logic 720.

Video content metadata error identifying logic 710 may identify video content metadata errors. For example, video content metadata error identifying logic 710 may identify video content metadata errors associated with invalid video content metadata entries received from video content metadata validation module 310. In some instances, video content metadata validation module 310 may identify a video content metadata entry as generally invalid, or identify only a single error in the invalid video content metadata entry. Video content metadata error identifying logic 710 may identify each error in the invalid video content metadata entry.

Video content metadata error correction logic 720 may correct invalid video content metadata entries to valid video content metadata entries based on video content metadata error correction files. Video content metadata error correction logic 720 may identify, from the video content metadata error correction files, instructions regarding a process, a database, a mapping etc., to be used in converting invalid video content metadata entries to valid video content metadata entries.

According to one embodiment, video content metadata error correction logic 720 may map an external genre or rating to approved values. For example, the external genre or rating may be associated with or generated by a partner entity. Video content metadata error correction logic 720 may identify a database of approved values that correspond to the external genre or rating and convert the invalid video content metadata entry to a valid video content metadata entry.

FIG. 8 is a flow chart of an exemplary process for validating video content metadata according to implementations described herein. In one implementation, process 800 may be performed by video content metadata validation server 140. In another implementation, some or all of process 800 may be performed by another device or group of devices, including or excluding video content metadata validation server 140.

As shown in FIG. 8, video content metadata validation server 140 may receive a video content metadata entry. For example, video content metadata validation server 140 may receive the video content metadata entry among a batch of video content metadata entries to be processed prior to ingestion in catalog 330. The video content metadata entry may be associated with (or describe) video content that is provided by a service provider or associated entities.

Video content metadata validation server 140 may access video content metadata validation files (block 804) associated with the customer transaction. For example, video content metadata validation server 140 may retrieve video content metadata validation files that specify a format against which each of the video content metadata fields of each video content metadata entry are to be validated.

Video content metadata validation server 140 may determine whether the video content metadata entry is valid (block 806). A video content metadata entry may be valid if it includes mandatory video content metadata fields and conforms to predetermined requirements for each of the included video content metadata fields. Video content metadata validation server 140 may also validate the video content metadata entry for required functionality associated with particular video content metadata fields (i.e., video content metadata validation server 140 may check whether a function associated with the particular video content metadata field is properly For example, video content metadata validation server 140 may validate each video content metadata field of the video content metadata entry. In a particular example, for video preview or image types, video content metadata validation server 140 may check whether the URLs associated with the video preview or image types are well formed. In a further implementation, video content metadata validation server 140 may verify that the URLs are working (i.e., video content metadata validation server 140 may access the video preview or image type).

If the video content metadata entry is valid (806, yes—all video content metadata entry fields are valid), video content metadata validation server 140 may report the video content metadata entry as a valid video content metadata entry (block 808). The valid video content metadata entry may be ingested into catalog 330.

If the video content metadata entry is invalid (806, no—at least one video content metadata entry field is invalid), video content metadata validation server 140 may report the video content metadata entry as an invalid video content metadata entry (block 810). For example, video content metadata validation server 140 may compile all invalid video content metadata entries and output at one time to an associated database.

Video content metadata validation server 140 may determine whether the invalid video content metadata entry includes fixable errors (812). If the invalid video content metadata entry includes fixable errors (block 812—yes, for all errors in invalid video content metadata entry), video content metadata validation server 140 may apply error correction files to fix invalid video content data entry to determine a corrected valid video content metadata entry (block 814). Fixable errors in this instance may refer to errors in the video content metadata that may be fixed automatically by video content metadata validation server 140 without further instructions (e.g., from service provider personnel, etc.). Video content metadata validation server 140 may report the corrected valid video content metadata entry, which may be ingested into catalog 330.

At block 816, if the invalid video content metadata entry includes at least one error that is not fixable, video content metadata validation server 140 may report the invalid video content metadata entry. For example, video content metadata validation server 140 may report the particular error for the invalid video content metadata entry.

Systems and/or methods described herein may allow validation of video content metadata for video content items that are to be ingested into a combined catalog for physical video content items and digital video content items. A single video content metadata entry may be determined for each particular video content item. The video content metadata may be validated for each video content metadata entry on a video content metadata field by video content metadata field basis.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 8, the order of the blocks may be modified in other implementations. Further, non-dependent blocks may be performed in parallel.

It will be apparent that different aspects of the description provided above may be implemented in many different forms of machine-readable instructions, firmware, and hardware in the implementations illustrated in the figures. The actual machine-readable instructions or specialized control hardware used to implement these aspects is not limiting of the invention. Thus, the operation and behavior of these aspects were described without reference to the specific machine-readable instructions—it being understood that machine-readable instructions and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and machine-readable instructions.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A computer-implemented method comprising:
   receiving a video content metadata entry, wherein the video content metadata entry includes at least one video content metadata field and is associated with a video content item that is listed in a combined catalog that includes items corresponding to physical video content comprising video content distributed as physical assets via a physical video content distribution system associated with a first entity and digital video content comprising video content distributed digitally via a digital video content system associated with a partner entity;
   accessing video content metadata validation rules, wherein the video content metadata validation rules are provided based on identities of the first entity and the partner entity, and wherein the video content metadata validation rules:

define a validity of video content metadata based on consistency of the video content metadata entry with a video content metadata format across listings of the physical assets and the digital video content in the combined catalog, define a plurality of options to bring video content metadata that does not conform to the video content metadata format into compliance with the video content metadata format, wherein the plurality of options include mapping video content metadata that does not conform to the video content metadata format to video content metadata that conforms to the video content metadata format using a database of metadata values, and allow settlement of accounts between the first entity and the partner entity;

determining, by a processing device, whether the video content metadata entry is valid based on the video content metadata validation rules for ingestion into the combined catalog in association with the physical video content distribution system and the digital video content system;

reporting the video content metadata entry as a valid video content metadata entry in response to a determination that the video content metadata entry is valid; and reporting the video content metadata entry as an invalid video content metadata entry in response to a determination that the video content metadata entry is invalid.

2. The computer-implemented method of claim 1, wherein determining whether the video content metadata entry is valid, further comprises:

identifying mandatory video content metadata fields for the video content metadata entry based on the video content metadata validation rules;

determining whether the at least one video content metadata field includes the mandatory video content metadata fields; and identifying the video content metadata entry as a valid video content metadata entry in response to a determination that the at least one video content metadata field includes the mandatory video content metadata fields.

3. The computer-implemented method of claim 1, wherein the at least one video content metadata field includes a ratings field and determining whether the video content metadata entry is valid, further comprises:

identifying a list of preapproved genres or ratings based on the video content metadata validation rules;

determining whether a video content rating of the video content metadata entry matches one of the list of preapproved genres or ratings; and determining that the video content metadata entry is valid in response to a determination that the video content rating of the video content metadata entry matches one of the list of preapproved genres or ratings.

4. The computer-implemented method of claim 3, further comprising:

determining that the video content metadata entry is invalid in response to a determination that the video content rating of the video content metadata entry does not match one of the list of preapproved genres or ratings;

mapping, using the database, the video content rating of the video content metadata entry to one of the list of preapproved genres or ratings to correct the invalid video content metadata entry; and determining that the video content metadata entry is valid.

5. The computer-implemented method of claim 1, wherein the video content item is one of a movie, a video game, or a television series.

6. The computer-implemented method of claim 1, wherein determining whether the video content metadata entry is valid, further comprises:

identifying at least one dependency based on one of the at least one video content metadata field and the video content metadata validation rules; and identifying the video content metadata entry as valid in response to a determination that the video content metadata entry is in compliance with the at least one dependency.

7. The computer-implemented method of claim 1, wherein the one of the at least one video content metadata field is a purchase options field for at least one of the physical assets or the digital video content and wherein determining whether the video content metadata entry is valid further comprises:

determining whether the video content metadata entry includes a required associated field to the purchase options field; and determining that the video content metadata entry is valid in response to a determination that the video content metadata entry includes the required associated field.

8. The computer-implemented method of claim 1, wherein the at least one video content metadata field includes a physical video content field and determining whether the video content metadata entry is invalid, further comprises:

identifying multiple physical video content items associated with the physical video content field; and determining that the video content metadata entry is invalid in response to identifying multiple physical video content items associated with the physical video content field.

9. The computer-implemented method of claim 1, further comprising:

identifying a mandatory field based on a dependent system for the video content metadata; and determining that the video content metadata entry is valid based on whether the video content metadata entry includes the mandatory field.

10. The computer-implemented method of claim 1, wherein determining whether the video content metadata entry is valid, further comprises:

determining whether the video content metadata entry includes a preview class with a run time set to a predetermined maximum interval;

determining whether a preview uniform resource locator (URL) includes a valid format in response to determining that the video content metadata entry includes a preview class with the run time set to the predetermined maximum interval; and identifying the video content metadata entry as invalid if the preview URL does not include a valid format.

11. The computer-implemented method of claim 1, wherein determining whether the video content metadata entry is valid, further comprises:

determining whether the video content metadata entry is valid based on determining whether an image profile is available via a digital connection.

12. The computer-implemented method of claim 1, further comprising:

determining that a licensing window associated with the digital video content system expires prior to a licensing window associated with the physical video content distribution system; and reporting the video content metadata entry as invalid based on the licensing window associated with the digital video content system expiring prior to the licensing window associated with the physical video content distribution system.

13. A device, comprising:
a memory to store a plurality of instructions; and
a processor configured to execute the instructions in the memory to:
   receive a video content metadata entry, wherein the video content metadata entry includes at least one video content metadata field and is associated with a video content item that is listed in a combined catalog that includes items corresponding to physical video content comprising video content distributed as a physical asset via a physical video content distribution system associated with a first entity and digital video content comprising video content distributed digitally via a digital video content system associated with a partner entity;
   access video content metadata validation rules, wherein the video content metadata validation rules are provided based on identities of the first entity and the partner entity, and wherein the video content metadata validation rules:
      define a validity of video content metadata based on consistency of the video content metadata entry with a video content metadata format across listings of physical assets and the digital video content in the combined catalog,
      define a plurality of options to bring video content metadata that does not conform to the video content metadata format into compliance with the video content metadata format, wherein the plurality of options include mapping video content metadata that does not conform to the video content metadata format to video content metadata that conforms to the video content metadata format using a database of metadata values, and
      allow settlement of accounts between the first entity and the partner entity;
   determine whether the video content metadata entry is valid based on the video content metadata validation rules for ingestion into the combined catalog in association with the physical video content distribution system and the digital video content system;
   report the video content metadata entry as a valid video content metadata entry in response to a determination that the video content metadata entry is valid; and
   report the video content metadata entry as an invalid video content metadata entry in response to a determination that the video content metadata entry is invalid.

14. The device of claim 13, wherein, when determining whether the video content metadata entry is valid, the processor is further to:
   identify mandatory video content metadata fields for the video content metadata entry based on the video content metadata validation rules;
   determine whether the at least one video content metadata field includes the mandatory video content metadata fields; and
   identify the video content metadata entry as a valid video content metadata entry in response to a determination that the at least one video content metadata field includes the mandatory video content metadata fields.

15. The device of claim 13, wherein the at least one video content metadata field includes a ratings field and when determining whether the video content metadata entry is valid, the processor if further to:
   identify a list of preapproved genres or ratings based on the video content metadata validation rules;
   determine whether a video content rating of the video content metadata entry matches one of the list of preapproved genres or ratings; and
   determine that the video content metadata entry is valid in response to a determination that the video content rating of the video content metadata entry matches one of the list of preapproved genres or ratings.

16. The device of claim 14, wherein the one of the at least one video content metadata field is a purchase options field and wherein when determining whether the video content metadata entry is valid, the processor is further to:
   determine whether the video content metadata entry includes a required associated field to the purchase options field; and
   determine that the video content metadata entry is valid in response to a determination that the video content metadata entry includes the required associated field.

17. A non-transitory computer-readable medium including instructions to be executed by a processor, the instructions including one or more instructions, when executed by the processor, for causing the processor to:
   receive a video content metadata entry, wherein the video content metadata entry includes at least one video content metadata field and is associated with a video content item that is listed in a combined catalog that includes items corresponding to physical video content comprising video content distributed as a physical asset via a physical video content distribution system associated with a first entity and digital video content comprising video content distributed digitally via a digital video content system associated with a partner entity;
   access video content metadata validation rules, wherein the video content metadata validation rules are provided based on identities of the first entity and the partner entity, and wherein the video content metadata validation rules:
      define a validity of video content metadata based on consistency of the video content metadata entry with a video content metadata format across listings of physical assets and the digital video content in the combined catalog,
      define a plurality of options to bring video content metadata that does not conform to the video content metadata format into compliance with the video content metadata format, wherein the plurality of options include mapping video content metadata that does not conform to the video content metadata format to video content metadata that conforms to the video content metadata format using a database of metadata values, and
      allow settlement of accounts between the first entity and the partner entity;
   determine whether the video content metadata entry is valid based on the video content metadata validation rules;

report the video content metadata entry as a valid video content metadata entry in response to a determination that the video content metadata entry is valid; and report the video content metadata entry as an invalid video content metadata entry in response to a determination that the video content metadata entry is invalid.

18. The non-transitory computer-readable medium of claim 17, wherein, when determining whether the video content metadata entry is valid based on the video content metadata validation rules, the processor is configured to:

determine whether the video content metadata entry is valid based on a specific context of the video content metadata, wherein the specific context is determined by a type of video content asset associated with the video content metadata entry.

19. The computer-implemented method of claim 1, wherein reporting that the video content metadata entry is invalid further comprises:

reporting that the video content metadata entry is invalid based on an ingestion exception associated with at least one of the physical video content distribution system or the digital video content system.

20. The computer-implemented method of claim 1, wherein accessing the video content metadata validation rules further comprises:

accessing the video content metadata validation rules that support metadata associated with customer service.

* * * * *